Dec. 17, 1940.  A. C. LINDGREN ET AL  2,224,970
HARVESTER THRESHER
Filed Sept. 16, 1937  4 Sheets-Sheet 1

Dec. 17, 1940.     A. C. LINDGREN ET AL     2,224,970
HARVESTER THRESHER
Filed Sept. 16, 1937     4 Sheets-Sheet 2

Inventors
Alexus C. Lindgren
and Clemma R. Kane
By V. F. Lassagne
Atty.

Dec. 17, 1940.　　A. C. LINDGREN ET AL　　2,224,970

HARVESTER THRESHER

Filed Sept. 16, 1937　　4 Sheets-Sheet 3

Inventors
Alexus C. Lindgren
and Clemma R. Raney
By /S. Lessagne
Atty.

Dec. 17, 1940.  A. C. LINDGREN ET AL  2,224,970
HARVESTER THRESHER
Filed Sept. 16, 1937  4 Sheets-Sheet 4
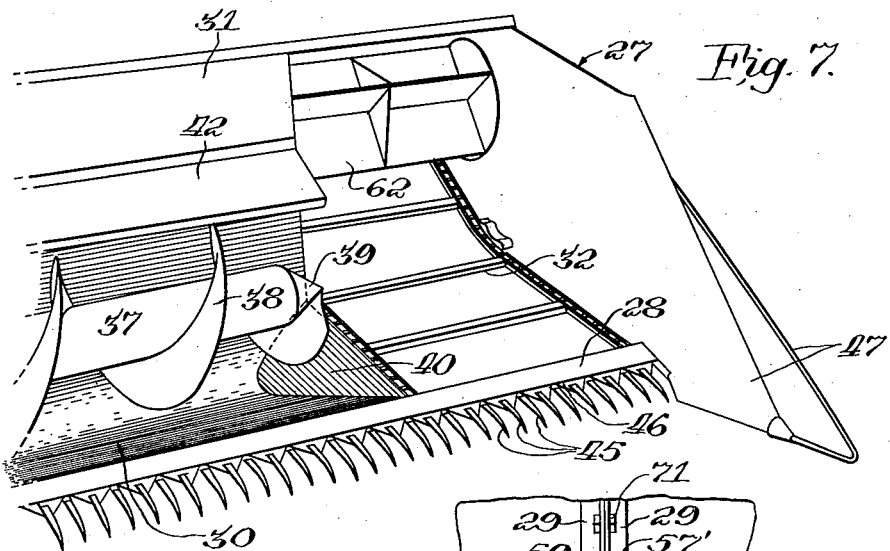
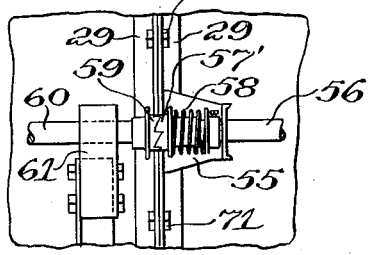
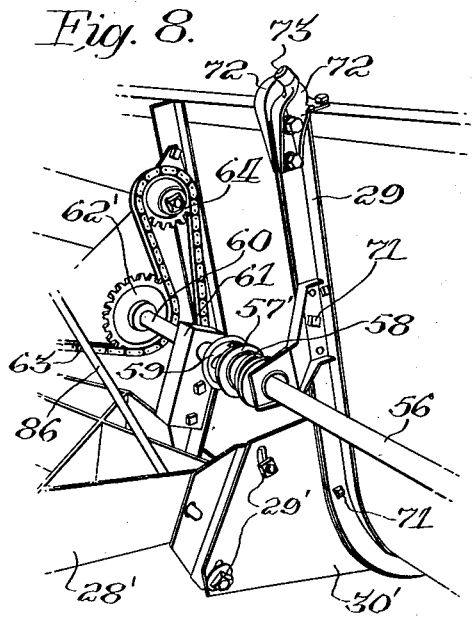
Inventors
Alexis C. Lindgren
and Clemma R. Raney
By V. F. Lassagne Patented Dec. 17, 1940

2,224,970

UNITED STATES PATENT OFFICE 2,224,970

HARVESTER THRESHER

Alexus C. Lindgren, Chicago, and Clemma R. Raney, Riverside, Ill., assignors to International Harvester Company, a corporation of New Jersey Application September 16, 1937, Serial No. 164,234

12 Claims. (Cl. 56—20)

The invention relates to a harvester thresher and more particularly to that type having a harvester platform including an auger conveyer for conveying the cut grain transversely into a longitudinally disposed feeder that serves to direct the grain into the threshing cylinder of the thresher part of the machine.

In these so-called auger types of combines it has not been possible in the past to narrow the width of the machine by folding the platform because of the mounting of the auger which made such folding or narrowing of the platform impossible. Since these harvester threshers are of relatively large size, it is difficult to move them through narrow gates and over narrow passageways in transporting the machine from one field to another. It is desirable, therefore, that a structure be provided which will permit a harvester thresher of this auger type to be materially narrowed for transport through narrow places.

In auger combines of the type where the auger feeds into the side of the longitudinal feeder for the thresher, it is desirable to construct the discharge end of the auger in a manner efficiently to cause it to transfer the cut grain onto the feeder conveyer. It is also important to construct the trough or platform structure beneath the discharge end of the auger in a manner preventing the formation of a pocket which will catch loose grain and prevent it from being transferred onto the longitudinal feeder conveyer.

It is also desirable to provide improved adjusting mechanism for raising and lowering the harvester part to adjust the height of cut thereof, and to associate such means with an improved operator's deck so that control of the combine may be as efficient and convenient as possible.

For machines of this type, it is also desirable to provide an improved counterbalancing mechanism for the harvester part as well as an improved means for supporting the auger conveyer over the platform trough.

The main object of the invention, therefore, is generally to provide an improved harvester thresher, or combine as they are also called.

Another object of the invention is to provide a harvester thresher having a harvester part including an auger conveyer embodying an improved discharge end construction for the auger conveyer to facilitate the transfer of cut grain therefrom onto a longitudinally disposed feeder conveyer for the thresher.

Another object of the invention is to provide an improved construction for the platform trough below the discharge end of said auger conveyer to prevent formation of a pocket, thereby also facilitating transfer of cut material from the platform trough to the longitudinal feeder conveyer.

Still another important object of the invention is to provide in an auger type of harvester part for a harvester thresher, means enabling the outer end of the harvester to be folded in a facile manner for narrowing the overall width of the machine so that it may be conveniently transported through narrow places.

Another object is to provide an improved means for mounting the said auger conveyer.

Another object is to provide an improved means for counterbalancing the weight of the harvester part to facilitate adjustment thereof when altering the height of cut.

Another object is to provide an improved adjusting means for raising and lowering the harvester part.

Another object is to provide an improved operator's deck, or station, on the harvester thresher associated with said adjusting means in such a manner as to make adjustments of the harvester part simple and convenient.

Another important object of the invention is to make possible the folding of the harvester part without interfering with or having to dismantle the drive connections for the auger.

Another important object is to provide a simple means for maintaining the axis of the auger at all times parallel to the bottom of the cooperating platform trough.

Other important objects of the invention will become known as the disclosure is more fully made. Briefly, these desirable objects may be achieved by providing a harvester thresher having a transverse axle and a wheel supporting each end thereof, said axle, carrying along its stubbleward side a forwardly extending draft frame and between said draft frame and the grainward wheel a longitudinally disposed thresher part on top of which is disposed a motor having appropriate connections therefrom to drive the various operative parts of the machine. The forward end of the thresher part carries a transverse shaft from which is hingedly hung for up and down movement a harvester part which includes a longitudinal feeder in forward alinement with the thresher part and a transversely extending platform trough part extending in a grainward direction and for a considerable length grainwardly of the grainward wheel of the machine but forwardly of the axle. The axle carries an improved counterbalancing mechanism for springing the weight of said harvester part, and an operator's deck, carried transversely across the top of the thresher, has associated with it manually operable adjusting means for raising and lowering said harvester part. The harvester part is a unit composed of the feeder and an auger conveyer along with the platform trough for the latter, and a sickle, or knife, extending the full width of the harvester part in advance of the feeder and the auger conveyer. The auger conveyer is driven and supported from its outer, or grainward end only, and preferably terminates short of the feeder conveyer so that its feeds into the side of the latter. The terminal, or discharge, end of the auger conveyer is constructed with a cone shaped end and cooperates with a ramp formed in the bottom of the trough so that the cone and the ramp cooperate effectively to transfer all material from the trough onto the feeder conveyer. The outer end of the platform, which includes the auger conveyer, is formed with upper and lower hinge means arranged along an upwardly and rearwardly inclined axis disposed slightly stubblewardly of the grainward wheel and in advance thereof so that this outer grainward portion of the harvester part may be hinged upwardly and forwardly to narrow the width of the machine an amount equal to about the wheel tread of the machine, thus making it possible conveniently to move same through narrow places.

This improved construction is shown in the accompanying drawings wherein:

Figure 3 is an enlarged detail perspective view to show the hinge structure which makes possible the folding of the harvester part;

Figure 7 is a front detail perspective view of the harvester part showing the relationship between the discharge end of the auger and the longitudinal feeder conveyer for the thresher;

Figure 8 is a rear perspective view of the hinge and driving structure for the folding part of the platform;

Figure 9 is a rear elevational view showing in detail the driving coupling for the auger drive means;

Figure 10 is a cross sectional view taken along the line 10—10 of Figure 5 to illustrate the means for leveling the axis of the auger to be parallel with the bottom of the auger trough; and, Figure 11 is a diagrammatic plan view of the harvester thresher.

Figure 1:
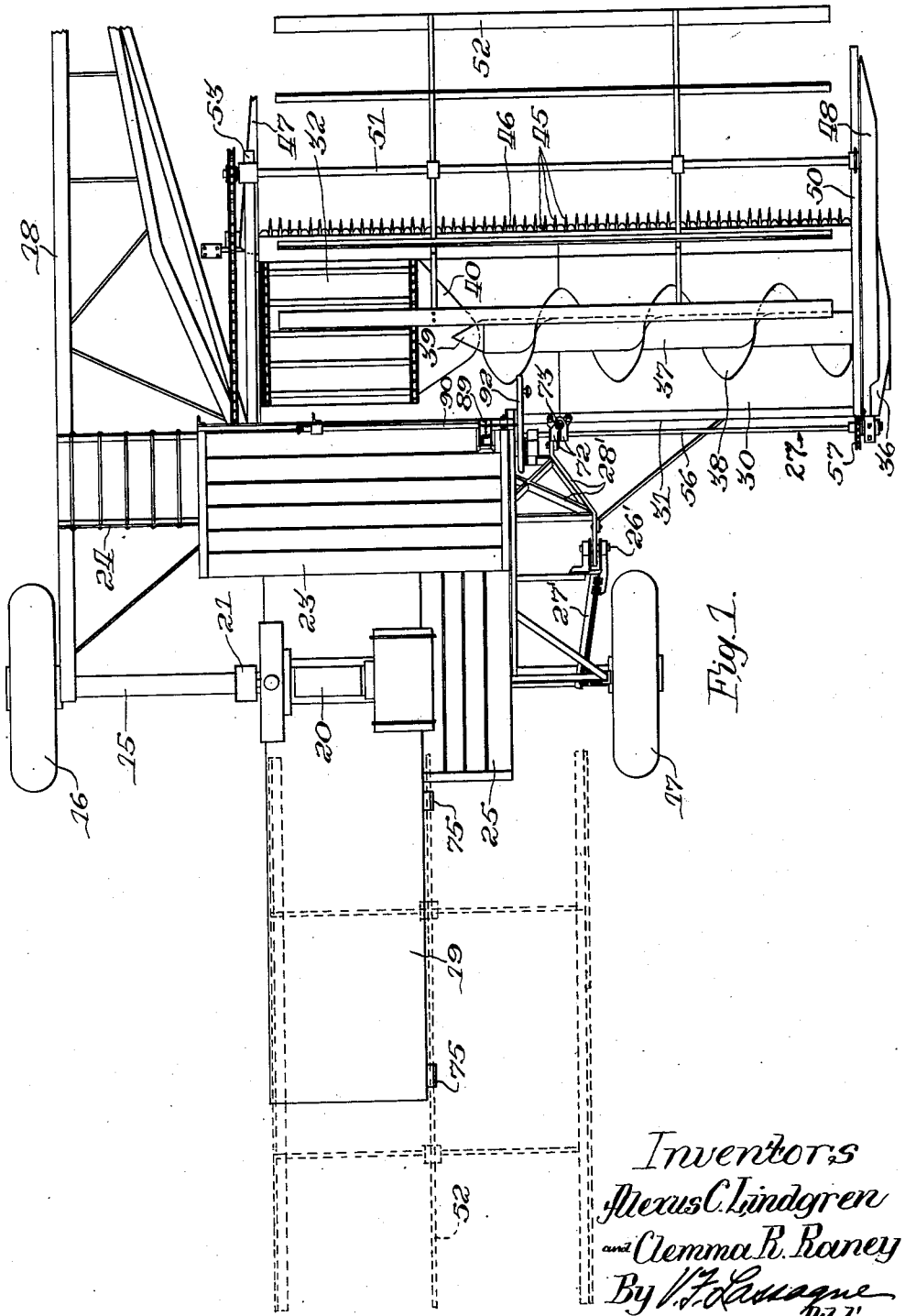
Figure 1 is a general plan view of the harvester thresher.
Figure 11:
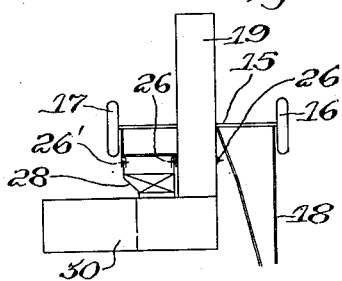

The general organization of the improved harvester thresher is shown in Figures 1 and 11, where it will be seen that a transverse dead axle 15 is provided, with one end thereof supported in a stubbleward wheel 16 and the other end of said axle being carried in a grainward wheel 17, both of which wheels for the sake of illustration having been shown as of the pneumatic rubber tire type. Connected to and extending longitudinally forwardly from the stubbleward end of the axle 15 is a draw frame 18, the forward end of which is not shown but which it will be understood can be connected to the draw-bar of a tractor. Substantially midway between the two wheels 16 and 17, the axle 15 rigidly carries a longitudinally disposed thresher part or grain separator 19 on top of which is transversely positioned an internal combustion engine 20, the crankshaft of which carries a pulley 21 hanging over the stubbleward side of the thresher body 19. It will be noted that the engine 20 is disposed directly over the axle 15 so that the weight of the engine is transmitted directly to the axle 15. Extending forwardly from the thresher body 19 is a rigid frame structure 22 for supporting a transverse operator's deck or station 23 running transversely across the front end of the thresher body 19, there being a ladder 24 extending in a transverse and downward direction to the draw frame 18 so that an operator can conveniently climb up to his station 23, the frame structure 22 also extending around the grainward side of the thresher body 19, as shown in Figure 1, to provide an auxiliary longitudinally disposed operator's deck 25 in the nature of an extension of the deck 23 to enable an attendant to crank the engine 20.

The forward lower edge of the body 19 carries a transverse shaft 26 from which is pivotally hung a harvester part 27 which, at its front end, includes a transverse angle bar 28 and rearwardly and upwardly curved angle bars 29 forming a frame upon which is mounted a similarly curved sheet metal trough 30 including a backboard portion 31 which at its stubbleward end is cut off to provide a space for a longitudinally running endless feeder conveyer 32. This harvester unit is connected to the shaft 26 for up and down pivotal movement and the outer end, in a grainward direction, is hung from a coaxial hinge pin 26', said latter pin being carried in a frame structure 27' braced to the axle 15. A line lever structure 28', as shown in Figure 8, is rigidly secured by means of bolts 29' and ears 30' to the frame structure 29 for the backboard 31 of the platform trough 30.

Figure 5:
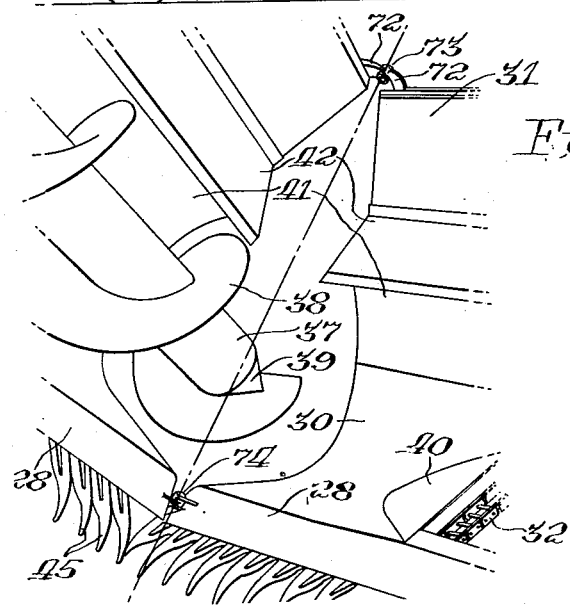
Figure 5 is a fragmentary detail side elevational view showing the harvester part unfolded or in its operative cutting position.

As shown in Figure 5, the grainward end of the harvester platform structure includes an end angle bar frame piece 29 and an upwardly and rearwardly inclined frame plate 33. This end angle bar 29 and frame 33 carries a rectangular plate 34 which is suitably formed with a cylindrical extension 35 braced by integral veins 36 radiating from the cylinder 35. This end wall or plate 34 thus is very sturdy and the cylindrical portion 35 thereof forms a support for rigidly carrying in any appropriate manner an inner shaft, not shown, for mounting an auger shaft 37 including the auger flights 38. This shaft 37 and the auger formed thereon extend transversely of the trough 30, the large hollow shaft having formed at its discharge end a conically shaped tip 39 which terminates just short of the grainward edge of the feeder conveyer 32. The trough 30 below the auger 38 below this tip 39 merges into a ramp portion 41 which is upwardly and stubblewardly inclined so that material fed from the discharge end of the auger 38 will be wiped or forced laterally upward onto the feeder conveyer 32 which is disposed at a somewhat higher level than the bottom of the trough 30 thus eliminating any chance for material to accumulate at the discharge end of the auger and insuring that all material from the auger and trough will be transferred onto the feeder conveyer. The flights or turns of the auger 38 are continued on a reduced pitch diameter onto the cone shaped tip 39, as best shown in Figure 7.

To prevent the auger from carrying the material around itself and to insure that the material will be moved in the direction of the feeder conveyer 32, the backboard 31 on its front face behind the auger is formed with an upwardly and forwardly curved sheet metal inverted trough portion 41 tied to the backboard by an upper brace or shield portion 42, this shield structure 41—42 terminating with the end of the backboard 31 adjacent the grainward side of the feeder 32, as shown in Figure 7.

It will be noted that the plate 34 is secured to the end frame 29 and frame 33 at four points by bolts 43, each one of these connections being as shown in Figure 10 where it will be seen that a pack of shims, or washers, 44 is arranged between the plate 34 and the frame 29, as well as the frame 33, so that by taking out or putting in more of the shims or washers 44 the plate 34 may be cocked or mounted in various angular positions with respect to a vertical plane to insure leveling of the auger shaft 37 and the retention thereof with its axis parallel at all times to the run of the trough 30.

The bar 29, heretofore described, extends along the full width of the platform 30 and the feeder 32, said bar carrying the usual finger guards 45 for a reciprocating sickle 46 which cuts the grain, the sickle, it being noted, extending in front of the auger as well as in front of the feeder 32, the ends 27 and 33 of this platform structure respectively carrying divider members 47 and 48. The frame piece 33 carries an upright hinged post 49 on which is carried a forwardly extending frame piece 50 for mounting the grainward end of a reel shaft 51 on which is carried the usual reel 52, the said reel shaft at its stubbleward end being carried by a forwardly extending frame bar 53 similar to the frame 50 and supported in a similar manner by means of an upwardly extending hinged post 54.

Figure 4:
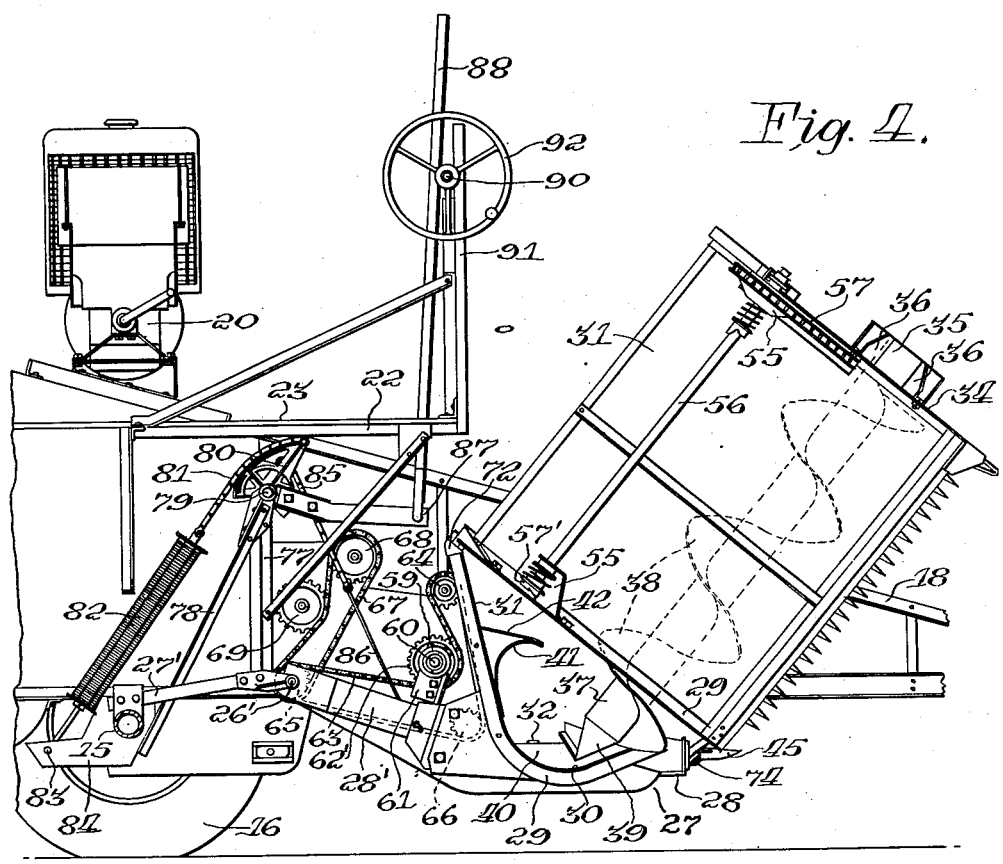
Figure 4 is a general side elevational view looking from the grainward side showing the harvester part folded to its transport position.
Figure 5:
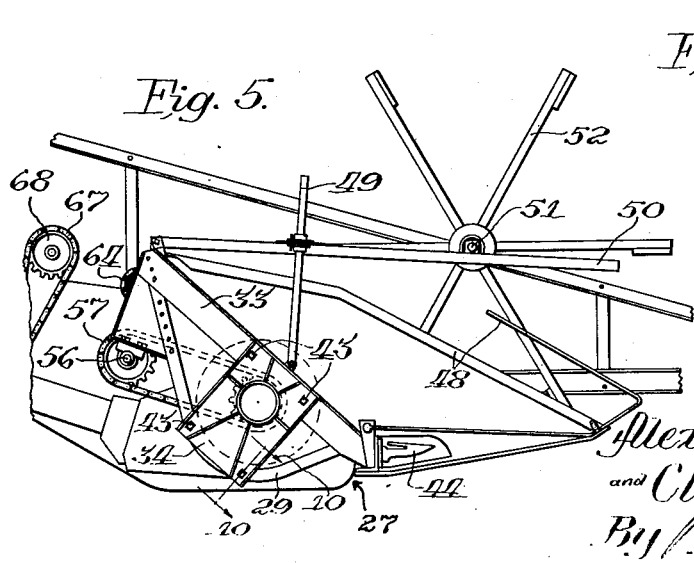
Figure 6:
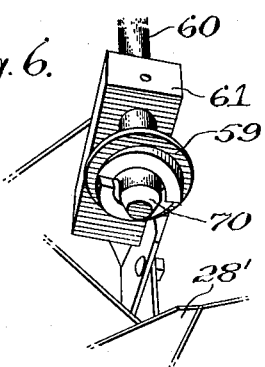
Figure 6 is a detail view of a drive coupling part used in driving the auger.

The frame members 29 carry brackets 55 for supporting a transverse shaft 56 on the backboard 31. The outer end of this shaft carries a sprocket wheel and chain connection 57 to drive the auger 38 in any desired manner. The stubbleward end of the shaft 56 includes a jaw clutch part 57' which is adapted to be pressed into engagement by a spring 58 with a complementary jaw clutch part 59 formed on a coaxial shaft 60 carried in a bearing 61 in any suitable manner, as shown in Figures 8 and 9. This shaft 60 extends across the feeder conveyer 32 and carries and drives a lower beater 62 to assist the feeder 32 in transferring the cut material rearwardly into the separator body 19 for threshing. This shaft 60 carries a sprocket wheel 62' driven from a chain 63 also trained around an idler wheel 64, the lower run of said chain passing around a sprocket 65 on the axis 26, which sprocket is on the shaft of the drive roller for the feeder conveyer 32. The front loop of the chain 63 is trained around an idler wheel 66. Another drive chain 67 drives a sprocket wheel 68 for an upper beater over the feeder 32, which beater is not shown, said chain 67 being trained around an idler wheel 69, as shown in Figure 4. It will be noted from Figure 6 that the clutch coupling 59 has a tapered projecting end 70 adapted to fit a socket in the complementary clutch part 58 in establishing and centering the driving coupling between the shaft 56 and the shaft 60.

Figure 2:
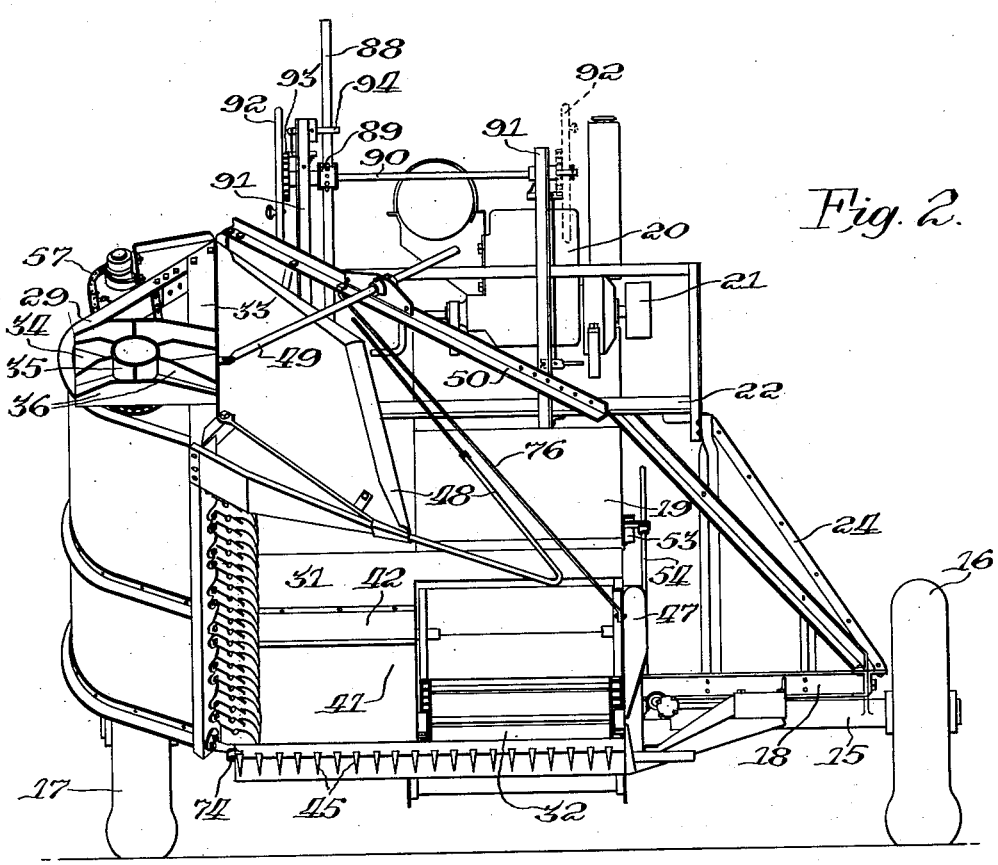
Figure 2 is a front elevational view thereof with the outer or grainward portion of the harvester part folded for transport.

As shown in Figures 8 and 9, a pair of adjacent angle bars 29 are releasably bolted together by bolts 71 and the upper ends of these two adjacent bars 29 carry complementary hinge brackets 72 hingedly connected together by a hinge pin 73. See also Figure 3. The bar 28 is also divided by joining two portions thereof in end to end relation by means of a hinge pin 74. These hinge pins 73 and 74 are on a common axis inclined rearwardly and upwardly, as indicated in Figure 3, so that when the bolts 71 are removed the entire outer end of the platform, including the auger 38, may be hingedly swung up to the position shown in Figures 2 and 4, in which position said outer end of the platform is moved upwardly and forwardly because of the tilted axis provided so that the width of the harvester thresher may be materially reduced to a width equal substantially to the tread of the wheels 16 and 17. In other words, this hinge axis 73—74 is disposed sufficiently stubbleward of the grainward wheel 17 so that when the outer end of the harvester part has been folded, it will narrow the machine to a width equal to the tread of the wheels which support the machine, as shown in Figure 2. When the outer end of the harvester part is so folded, one or more of the guard fingers 45 adjacent the hinge 74 must be removed to provide the necessary clearance and, obviously, the reel 52 and its shaft 51 must also be removed from the supporting bars 50 and 53, the removed reel, if desired, being carried in suitable brackets 75 on top of the thresher body 19 as indicated by the dotted lines in Figure 1. Preferably, the reel should be longitudinally disposed in this position so that it too will be confined within the wheel tread of the machine. The drive to all of the various operative mechanisms is taken from the engine and its pulley 21, and since the driving mechanism forms no part of this invention, it will not be described.

When the outer end of the harvester part is hingedly swung to its folded position, a stay rod 76 is connected between a portion of the machine adjacent the divider member and the frame piece 50 so that when transporting the machine whipping of the folded part cannot occur.

The frame structure includes an upright post 77 appropriately braced as at 78, carrying on its upper end a pivot shaft 79 about which is turnable an eccentric rocker bracket 80 to which is connected one end of a chain 81 including a battery of counterbalancing springs 82 appropriately connected at a point 83 to a bracket 84 extending rearwardly from the axle 15, as shown in Figure 4. From the eccentric rocker element 80 also extends a chain 85 connected to a bail 86 which has opposite ends hooked into spaced points on the line lever structure 28. Connected to the rocker member 80 is a forwardly extending arm 87, to the front end of which is pivotally connected an upright rack bar 88 passing upwardly through a hole formed in the operator's deck 23, said rack bar 88 being movable up and down by a rotary pin wheel 89 on a transverse shaft 90 supported in brackets 91 along the front side of the operator's deck 23. The shaft 90 is turnable by a hand wheel 92 which can be slipped onto either end of the shaft 90 as indicated in dotted lines in Figure 2, so that said shaft 90 may be rotated from either end of the deck 23. When the wheel 92 is turned, the shaft 90 and pin 89 rotate to cause the rack bar 88 to raise or lower the arm 87 and rock the rocker member 80 which, through the chain 85 and bail 86, raises or lowers the entire harvester part about the axis 26—26' to adjust the height of cut of the harvester part. A lock means 93 of any standard form may be manually controlled by a lever 94 to hold the shaft 90 against rotation and maintain the harvester part locked in any desired position of adjustment. The shaft 90 serves as a front hand rail for the operator on the deck 23.

This constitutes the detailed description of the parts of the harvester thresher incorporated in this invention.

In use and operation, the machine is in the unfolded position shown in Figure 1. A tractor pulls the draw frame 18 to advance the harvester thresher over the ground on its two wheels 16 and 17. The engine 20, through pulley 21, provides power for driving the various operative parts such as the reel 52 and the sickle 46. As the machine advances over the ground, grain is cut and batted back by the reel onto the platform trough 30 and onto the feeder conveyer 32, the grain falling on the feeder conveyer 32 being immediately and directly advanced rearwardly into the separator 19 while that grain received by the auger conveyer 38 is moved in a stubbleward direction over the trough bottom 30 toward the feeder conveyer 32, the cone tip 39 and the ramp 40 between the auger and the conveyer facilitating the transfer of the cut grain from the platform trough 30 onto said feeder and the trough construction 41—42 acting as a guide to insure movement of the cut crop by the auger in a direction toward the feeder 32. The auger is firmly supported from one end only through the means of the reenforced plate 34 and the cylinder bearing extension 35 thereof and rigidly carried in the end frame pieces 29 and 33 of the harvester platform. The platform can be raised or lowered by the hand wheel 92 and the shaft 90 through the counterbalanced lift connections heretofore described. When the outer end of the platform trough is in the unfolded position, the clutch coupling 58—59 automatically connects the shafts 56 and 60 to insure transmission of the drive to the outer end of the auger for driving the same.

When it is desired to narrow the machine for transportation through narrow places, the reel 52 is removed and temporarily mounted on the brackets 75 on the thresher body 19. The outer portion of the platform can now be swung upwardly and forwardly about the hinge axis 13—14 to carry the platform to the position shown in Figures 2 and 4 for transportation, the brace rod 76 being put in place to retain the outer end of the platform in its folded position. The guide rail 41—42 is merely split along this axis, as indicated in Figure 3, so that the parts readily divide and come together again. The auger 38, of course, is carried entirely by this outer part of the harvester platform and, consequently, must fold with it as indicated in Figures 3 and 4. The clutch coupling 58—59 merely separates when this folding operation is performed.

This completes the description and operation of the improved harvester thresher, one practical example of which has been shown and described in this application. It is the intention to cover herein all such changes and modifications which do not in material respects constitute departures from the spirit and scope of the invention as indicated by the definitions thereof embodied in the appended claims.

What is claimed is:

1. In a harvester thresher having a thresher part, a harvester part including a transverse platform trough having a frame structure at its grainward end, the combination with said frame structure of a reenforced carrier plate mounted on said frame structure including means for mounting an auger conveyer over said platform trough, and means associated with the plate and frame structure for leveling the auger conveyer in relation to the bottom of said trough.

2. In a harvester thresher having a thresher part, a longitudinal feeder for the thresher part, a harvester part including a transverse platform trough the bottom of which is disposed at a lower level than the feeder and an auger conveyer supported over the trough to feed to the feeder, the combination with said trough of a ramp disposed in the trough below the discharge end of the auger to aid the auger in feeding material onto the feeder.

3. In a harvester thresher having a thresher part, a longitudinal feeder for the thresher part, a harvester part including a transverse platform trough the bottom of which is disposed at a lower level than the feeder and an auger conveyer supported over the trough to feed to the feeder, said auger conveyer including a relatively large diameter shaft portion, the combination with said shaft portion of a cone-shaped tip carried by the shaft at the discharge end of the auger to aid in transfer of material onto the feeder.

4. In a harvester thresher having a thresher part, a longitudinal feeder for the thresher part, a harvester part including a transverse platform trough the bottom of which is disposed at a lower level than the feeder and an auger conveyer supported over the trough to feed to the feeder, the combination with said trough of a ramp disposed in the trough to aid the auger in feeding material onto the feeder, and a conical tip at the terminal discharge end of the auger disposed above the ramp and cooperating therewith to transfer material onto the feeder.

5. In a harvester thresher, a transverse wheel supported axle, a longitudinal thresher part carried on the axle, a harvester part adjustably related to the thresher part, an engine on the thresher part, an operator's deck carried on the thresher part in advance of the engine, and manually controlled adjusting means for the harvester part located adjacent said deck, said deck including a longitudinal deck extension disposed on substantially a level with the deck alongside the thresher part to enable an operator to crank said engine.

6. In a harvester thresher, a transverse wheel supported axle, a longitudinal thresher part carried on the axle, a harvester part adjustably related to the thresher part, an engine on the thresher part, an operator's deck carried on the thresher part in advance of the engine, and manually controlled adjusting means for the harvester part located adjacent said deck, said adjusting means including an upright bar passing through an opening formed in the deck.

7. In a harvester thresher, a transverse wheel carried axle, a longitudinal draw-frame connected to the stubbleward end of the axle, a longitudinal thresher part carried on the axle grainwardly of the draw-frame, an engine on the thresher part, an operator's deck disposed on the top of the thresher part in advance of the engine, a ladder carried on the draw-frame and extending upwardly and transversely to said deck, and a deck extension extending longitudinally along the grainward side of the thresher part to enable an attendant to crank the engine.

8. In a harvester thresher, a longitudinal feeder and a transverse platform trough including a back member, the combination with the trough of an auger conveyer supported over the trough and having its discharge end positioned to feed into the side of the longitudinal feeder, and hinges disposed in the back member and trough intermediate the ends of the latter whereby the grainward end of the trough and back member may be folded to narrow the width of the harvester thresher for transport without removing the auger conveyer.

9. In a harvester thresher, a longitudinal feeder and a transverse platform trough, a transverse auger conveyer having its discharge end terminating adjacent the grainward edge of the feeder, means to support the auger conveyer over the trough in a manner to leave its discharge end free so that an unencumbered space is provided where the conveyer feeds onto the feeder, the combination with said trough of hinge means provided therein intermediate its length to enable the grainward portion of the trough to be upwardly folded without removing the auger to narrow the width of the harvester thresher.

10. In a harvester thresher having a longitudinal feeder mechanism and a harvester part operatively related thereto and including a trough extending grainwardly and transversely from the feeder mechanism, the combination with the harvester part of a support carried at its grainward end, an auger conveyer carried solely by the support and extending along the trough toward the feeder mechanism, the free discharge end of the auger terminating substantially at the grainward side of the feeder mechanism, and hinges embodied in the harvester part whereby the grainward end of the trough with the auger may be folded to narrow the harvester thresher for transport.

11. In a harvester thresher having a longitudinal feeder mechanism and a harvester part related thereto and including a trough extending grainwardly and transversely from the feeder mechanism, the bottom of said trough being disposed at a lower level than the feeder, the combination with the harvester part of an inclined ramp disposed at the junction of the feeder mechanism and the trough, a support rigidly carried at the grainward end of the harvester part, an auger conveyer carried solely by the support and extending along the trough toward the feeder mechanism, the free discharge end of the auger being reduced and terminating substantially at the inclined ramp and cooperating therewith to move material onto the feeder mechanism.

12. In a harvester thresher having a longitudinal feeder mechanism and a transverse harvester part operatively related thereto, said part being foldable with respect to the feeder mechanism about a substantially longitudinal pivot axis and including a trough extending grainwardly along the harvester part, the bottom of the trough when the harvester part is in operating position being disposed at a lower level than the feeder mechanism, the combination with the harvester part of a supporting structure rigidly carried at its grainward end, a second support adjustably carried by the structure, an auger conveyer carried solely by the second support and extending along the trough toward the feeder mechanism, the auger being substantially coextensive with the trough and having its free discharge end terminating substantially at the aforesaid pivot axis, and an upwardly inclined discharge ramp associated between the feeder mechanism and the bottom of the trough when the harvester part is in operative position.

ALEXUS C. LINDGREN.
CLEMMA R. RANEY.